United States Patent Office 2,819,255
Patented Jan. 7, 1958

2,819,255

VULCANIZABLE RUBBER COMPOSITIONS AND PROCESS

Harold Boardman, Wilmington, Del., assignor to Hercules Powder Company, Wilmington, Del., a corporation of Delaware No Drawing. Application May 5, 1955
Serial No. 506,359

12 Claims. (Cl. 260—85.1)

This invention relates to the art of rubber compounding and more particularly to an improved rubber composition.

The rubber industry depends almost entirely upon sulfur or sulfur-bearing materials as vulcanization agents. The vulcanization of rubber in the presence of sulfur is easily controlled and there has been a steady improvement in both the rate of curing and the quality of vulcanized products produced. This is due in part to the development of modern accelerators, activators and other additives which are used in conjunction with sulfur for vulcanizing rubber. In addition to sulfur, selenium and tellurium have been used as vulcanization agents and nitrobenzenes and organic peroxides have also been employed to some extent. With certain rubbers such as butyl rubber, red lead and p-quinone dioxime have been used as vulcanization agents.

Despite the fact that the art of vulcanizing rubber is well over one hundred years old, vulcanized rubber products from even the most modern and highly developed formulations, are unsatisfactory in certain respects. Sulfur vulcanized rubber, for example, is wanting in aging characteristics, that is, resistance to deterioration of its rubberlike properties and discoloration in the presence of oxygen or air, heat and particularly in conjunction with sunlight. There has been a need in the art for a vulcanizing agent capable of producing vulcanized rubbers having the advantageous properties of sulfur-cured rubbers but without the disadvantageous properties.

In accordance with the present invention, a vulcanized rubber product is prepared by vulcanizing a composition comprising a rubber selected from the group consisting of natural rubber and butalastic polymers, and from about 0.1% to about 10%, based on the weight of rubber, of an unsymmetrical peroxide having the structural formula

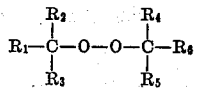

wherein $R_1$ is an aryl group and $R_2$, $R_3$, $R_4$, $R_5$ and $R_6$ are selected from the group consisting of hydrogen and alkyl groups of less than 4 carbon atoms. $R_2$, $R_3$, $R_4$, $R_5$ and $R_6$ may all be the same or each may be a different group or any two or more may be the same or different. The vulcanized product thus prepared is superior in many respects to vulcanized rubbers prepared using the vulcanization agents most commonly employed in the art. In particular, the vulcanized products of the invention are superior to sulfur-vulcanized rubbers in their resistance to deterioration upon aging in air or oxygen and particularly in the presence of heat and/or sunlight.

The following examples illustrate the specific embodiments of the invention and show the effectiveness of the specified peroxide vulcanization agents in the process of this invention. All parts are by weight unless otherwise specified.

EXAMPLES 1, 2, 3 AND 4

Rubber compositions were prepared containing the ingredients in the proportions indicated in Table I. The compositions were made by first preparing a masterbatch containing 1200 parts butadiene-styrene copolymer (general purpose cold rubber designated as GR-S 1500) and 600 parts of furnace black ("Philblack" O). The filler was incorporated into the rubber by thorough mixing on a standard two-roll rubber mill, the rolls being maintained at a temperature of 80–110° F. The polymer was first allowed to form a band on the front roll and the furnace black added as fast as practicable. The blend was then cross-cut and cross-rolled about 12 times each and the rubber composition removed. Portions of the finished masterbatch were weighed out and the peroxides were added to these portions in the amounts shown in Table I. The peroxides were incorporated into the rubber composition in the same manner that the furnace black was incorporated, i. e., by cross-rolling and cross-cutting about 12 times each after the peroxides had been added. The sheets thus prepared were allowed to stand overnight and then refined by 6 passes through tight rolls.

Table I

|  | Composition (parts) | | | |
|---|---|---|---|---|
|  | Ex. 1 | Ex. 2 | Ex. 3 | Ex. 4 |
| GR-S 1500 | 100 | 100 | 100 | 100 |
| Furnace Black | 50 | 50 | 50 | 50 |
| Methyl (α, α-dimethylbenzyl) peroxide | 2 |  |  |  |
| Methyl (α, α-dimethyl-p-methylbenzyl) peroxide |  | 1.35 |  |  |
| Methyl (α, α-dimethyl-p-isopropylbenzyl) peroxide |  |  | 1.54 |  |
| Tertiary butyl (α, α-dimethylbenzyl) peroxide |  |  |  | 1.54 |

The compositions thus prepared were next vulcanized in a closed multiple cavity mill to form sheets 6 inches square and 0.075 inch in thickness. These sheets were cured at 300° F. Table II presents physical property data on unaged specimens obtained by standard ASTM methods using ASTM type C dumbbell specimens in the tensile strength and elongation tests.

Table II

|  | Cure Time, Min. at 300° F. | Composition of— | | | |
|---|---|---|---|---|---|
|  |  | Example 1 | Example 2 | Example 3 | Example 4 |
| Mooney Scorch (MS Rotor) Min. to 10 Point Rise at 250° F |  |  | 28½ | 28 | 52 |
| Modulus at 200% Elongation, p. s. i | 7½ |  | 155 | 200 | 150 | 170 |
|  | 15 | 475 | 500 | 420 | 420 |
|  | 30 | 1,090 | 800 | 880 | 1,140 |
|  | 45 | 1,570 | 800 | 770 | 1,650 |
|  | 60 | 1,620 | 770 | 825 | 1,965 |
|  | 90 |  | 770 | 800 | 2,190 |
| Tensile Strength at Break, p. s. i | 7½ | 850 | 890 | 740 | 770 |
|  | 15 | 2,290 | 2,390 | 2,180 | 2,450 |
|  | 30 | 2,760 | 2,880 | 3,000 | 2,790 |
|  | 45 | 2,710 | 3,030 | 2,770 | 2,950 |
|  | 60 | 2,820 | 2,910 | 2,830 | 2,460 |
|  | 90 |  | 2,770 | 2,870 | 2,190 |
| Ultimate Elongation, Percent | 7½ | 680 | 660 | 710 | 810 |
|  | 15 | 540 | 560 | 550 | 600 |
|  | 30 | 350 | 450 | 440 | 370 |
|  | 45 | 280 | 460 | 430 | 280 |
|  | 60 | 280 | 460 | 440 | 230 |
|  | 90 |  | 430 | 440 | 200 |
| Shore A₁ Hardness | 7½ | 43 | 44 | 42 | 42 |
|  | 15 | 53 | 52 | 51 | 51 |
|  | 30 | 60 | 57 | 58 | 60 |
|  | 45 | 64 | 57 | 58 | 64 |
|  | 60 | 65 | 57 | 58 | 66 |
|  | 90 |  | 56 | 57 | 67 |
| Bashore Resilience | 7½ | 43 | 46 | 46 | 46 |
|  | 15 | 43 | 46 | 46 | 46 |
|  | 30 | 44 | 46 | 45 | 46 |
|  | 45 | 44 | 46 | 45 | 46 |
|  | 60 | 43 | 46 | 46 | 47 |
|  | 90 |  | 46 | 47 | 47 |

EXAMPLES 5 AND 6

The procedure of the preceding examples was followed in preparing natural rubber compositions of the following formulations:

*Table III*

|  | Composition (Parts) | |
| --- | --- | --- |
|  | Example 5 | Example 6 |
| Natural Rubber (smoked sheets) | 100 | 100 |
| Furanace Black | 50 | 50 |
| Tertiary butyl (α,α-dimethyl-benzyl)peroxide | 1.54 |  |
| Methyl(α,α-dimethyl-p-isopropyl-benzyl)peroxide |  | 1.54 |

The above compositions were next vulcanized in the manner of the preceding examples and unaged physical properties were found as follows:

*Table IV*

|  | Cure Time, min. at 300° F. | Composition of— | |
| --- | --- | --- | --- |
|  |  | Example 5 | Example 6 |
| Modulus at 300% Elongation, p. s. i. | 7½ <br> 15 <br> 30 <br> 60 |  <br> 1,075 <br> 1,825 <br> 2,525 |  <br> 1,010 <br> 1,490 <br> 1,920 |
| Tensile Strength at Break, p. s. i. | 7½ <br> 15 <br> 30 <br> 60 |  <br> 1,810 <br> 2,570 <br> 2,960 |  <br> 1,420 <br> 2,200 <br> 2,450 |
| Elongation at Break, Percent | 7½ <br> 15 <br> 30 <br> 60 |  <br> 405 <br> 370 <br> 345 |  <br> 390 <br> 385 <br> 355 |
| Shore A Hardness | 7½ <br> 15 <br> 30 <br> 60 |  <br> 39 <br> 47 <br> 51 |  <br> 36 <br> 45 <br> 46.5 |
| Bashore Resilience | 7½ <br> 15 <br> 30 <br> 60 |  <br> 44 <br> 47 <br> 48 |  <br> 42 <br> 43 <br> 44 |

EXAMPLE 7

The procedure of Examples 1 to 4 was followed in preparing a nitrile rubber composition from 100 parts of a butadiene-acrylonitrile emulsion copolymer containing 26% combined acrylonitrile ("Paracril" B), 50 parts furnace black and 1.54 parts tert-butyl(α,α-dimethylbenzyl) peroxide. The composition was vulcanized and unaged physical properties were found as follows:

*Table V*

|  | Cure Time, min. at 300° F. | Composition of Example 7 |
| --- | --- | --- |
| Modulus at 300% Elongation, p. s. i. | 7½ <br> 15 <br> 30 <br> 60 | 525 <br> 1,290 <br>  <br>  |
| Tensile Strength at Break, p. s. i. | 7½ <br> 15 <br> 30 <br> 60 | 990 <br> 2,510 <br> 3,050 <br> 3,540 |
| Elongation at Break, Percent | 7½ <br> 15 <br> 30 <br> 60 | 550 <br> 465 <br> 350 <br> 290 |
| Shore A Hardness | 7½ <br> 15 <br> 30 <br> 60 | 46.5 <br> 53.5 <br> 60 <br> 64.5 |
| Bashore Resilience | 7½ <br> 15 <br> 30 <br> 60 | 35 <br> 36 <br> 35 <br> 35 |

The peroxides of the invention are unsymmetrical peroxides having the structural formula

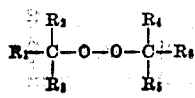

wherein $R_1$ is an aryl group and $R_2$, $R_3$, $R_4$, $R_5$ and $R_6$ are selected from the group consisting of hydrogen and alkyl groups of less than 4 carbon atoms.

The aryl groups referred to in the above formula may, for example, be phenyl, naphthyl, anthryl, phenanthryl and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$, or $R_5$. Aryl groups in which the alkyl substituents, if any, contain less than 8 carbon atoms are preferred.

In general, the peroxides of this invention are characterized by containing at least 10 carbon atoms and usually not more than about 40 carbon atoms. Specific peroxides preferred in the invention are methyl(α,α-dimethylbenzyl) peroxide, tertiary butyl(α,α-dimethylbenzyl) peroxide, methyl(α,α-dimethyl-p-isopropylbenzyl) peroxide, and methyl(α,α-dimethyl-p-methylbenzyl) peroxide.

The peroxides of the invention are nonvolatile peroxides, i. e., they have a vapor pressure sufficiently low at rubber compounding and vulcanization temperatures to prevent substantial loss of the peroxide by volatilization during rubber compounding and vulcanization. The nonvolatile peroxides of the invention are thus distinguished from volatile peroxides such as di(tertiary butyl) peroxide. In general, the peroxides of the invention have boiling points greater than about 150° C. and thus can be utilized at relatively high rubber compounding and vulcanization temperatures.

The peroxides of the invention decompose at a moderate rate under vulcanization conditions to form alkoxy free radicals. Thus, for example, methyl(α,α-dimethylbenzyl) peroxide decomposes to form a methoxy free radical and an α,α-dimethylbenzyloxy free radical. The decomposition of the peroxides is almost entirely dependent upon temperature. A particular advantageous characteristic of the peroxides is their stability during rubber compounding and their reactivity during vulcanization.

The peroxides of the invention can be prepared by methods known to the art. A particularly convenient method involves condensation of the corresponding alcohols of the general formula

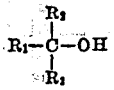

and hydroperoxides having the general formula

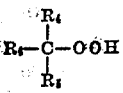

wherein $R_1$, $R_2$, $R_3$, $R_4$, $R_5$ and $R_6$ are the same as in the general formula given hereinabove. The amount of alcohol utilized should be at least the theoretical calculated amount to combine with all of the hydroperoxide and preferably slightly in excess of this amount. The condensation of the hydroperoxide with the alcohol is carried out in the presence of a catalytic amount up to about 0.5% of an acid-acting condensation catalyst based on the weight of the alcohol, and the temperature used is preferably between 50°–120° C. p-Toluene sulfonic acid can be utilized as the acid-acting condensation catalyst. The hydroperoxides and alcohols mentioned above may be prepared in accordance with processes well known to the art.

The peroxides of the invention in which $R_4$, $R_5$ and $R_6$ are all hydrogen can be produced conveniently by contacting aralkyl hydroperoxides with dimethyl sulfate in an aqueous alkaline medium. For example, methyl($\alpha,\alpha$-dimethylbenzyl) peroxide can be produced by dispersing cumene hydroperoxide with rapid stirring in an aqueous solution of sodium hydroxide while gradually adding a stoichiometric amount of dimethyl sulfate and maintaining the temperature at about 25–30° C. After all the dimethyl sulfate is added and the reaction is complete, the methyl($\alpha,\alpha$-dimethylbenzyl) peroxide can be taken up in petroleum ether and washed free of cumene hydroperoxide with 10% aqueous sodium hydroxide. The desired peroxide can then be recovered in a purity of about 90% by distilling off petroleum ether.

The quantity of peroxide utilized in preparing the rubber compositions of this invention will depend to a great extent upon the conditions to be utilized during vulcanization of the composition. In general, the quantity may vary from about 0.1% to 10% based on the weight of the rubber. The preferable amount is from about 0.25% to about 7.5%. The amount of peroxide used may also vary depending upon the type of rubber, the nature of the composition, that is, whether an accelerator is present, etc., and the properties desired in the product. The compounding of rubber and the vulcanization thereof are well known and the same manipulative techniques may be utilized in practicing this invention. However, utilizing the peroxides of this invention, formulation of rubber compositions will be simpler in that certain ingredients necessary for sulfur vulcanization processes are unnecessary.

The examples have shown the use of various peroxides as rubber vulcanization agents and have illustrated the vulcanization of GR-S, nitrile rubber and natural rubber. The invention is thus applicable to natural rubber and those synthetic rubbers designated in the art as butalastic polymers [Marchionna, Butalastic Polymers, Reinhold (1946)]. More specifically, the butalastic polymers are defined by Marchionna as synthetic, elastic polymers of a butadiene compound (with or without other compounds polymerizable therefrom).

The process of the invention can be applied, for example, to synthetic butalastic polymers such as those prepared by polymerizing diolefins, halogenated derivatives of diolefins or other substituted diolefins, or by copolymerizing diolefins with other compounds containing vinyl groups such as styrene, acrylic acid esters and acrylic acid nitrile. More particularly, the butalastic polymers may be those obtained by polymerizing any conjugated diolefin such as isoprene, dimethyl butadiene and chloroprene or by copolymerizing isoprene and styrene or isoprene and acrylonitrile. The process of the invention is particularly applicable to GR-S, both hot and cold rubbers, nitrile rubber and natural rubber.

In utilizing this invention, suitable fillers, reinforcing agents, antioxidants, vulcanizers, extenders, plasticizers, softeners, processing aids, as well as other activators and accelerators well known in the preparation of natural rubber and synthetic rubber compositions, may be employed in accordance with this invention. Certain materials when utilized in conjunction with the peroxides of this invention produce vulcanized rubber products with greater hardness. Utilizing such materials, a given amount of cure can be obtained using less peroxide than would be necessary in the absence of these materials. Materials which act to produce vulcanizates of higher hardness include furnace black, diphenyl guanidine, hexamethylenetetramine, hydrated lime, certain rosin soaps, such as heat-treated rosin soaps, sodium hydroxide, triethanolamine, etc.

Zinc oxide, reinforcing grades of carbon black, and the like, may be employed as reinforcing agents. Preferably, a mixture of suitable fillers and reinforcing agents is employed to give to the compositions the particular properties which may be desired. Thus, a mixture of zinc oxide and carbon black may be employed in the manner illustrated by the examples. Suitable pigments, such as ultramarine, vermilion, or the like, may be employed to impart to the composition a desired color.

In general, because of the marked stability of the present compositions to the effects of exposure to the atmosphere, the use of powerful antioxidants is not so essential as in the case of rubber compounded with sulfur. However, in the event that it is desirable further to decrease the effects of oxidation on the rubber, antioxidants may be added. Suitable antioxidants are, for example, diphenylamine, aldo-$\alpha$-naphthylamine, diphenylethylene diamine, phenyl-$\alpha$-naphthylamine, or phenyl-$\beta$-naphthylamine. In case a commercial synthetic rubber to which antioxidants normally are added during preparation is employed, the amount of antioxidant added during the compounding of the present compositions may be increased suitably.

The use of the various fillers, antioxidants, and the like hereinbefore mentioned is well known, and one skilled in the art will have no difficulty in arriving at a formulation suitable for a particular need.

Vulcanized products prepared in accordance with the present invention are of particular value in any application where resistance to deterioration in the presence of heat, oxygen, or sunlight is important. Such vulcanizates are very valuable in the manufacture of automobile tires and will also be found useful in the manufacture of inner tubes, rubber hoses, rubber-lined hoses, foot wear, electrical insulator goods, molded rubber articles and the like. The improved processing characteristics of rubber compositions containing the peroxides of this invention as vulcanization agents, that is, the resistance of such compositions to cure during milling, greatly improves and facilitates compounding procedures. The increased rate at which rubber compositions containing these vulcanization agents will cure at customary curing temperatures serves to expedite compounding with consequent savings in time and labor. The improved characteristics of the vulcanized product are apparent in their increased resistance to discoloration, increased tensile strength, superior hysteresis and electrical properties, increased resistance to oxidation and increased resistance to embrittlement on aging.

What I claim and desire to protect by Letters Patent is:

1. A rubber composition comprising a rubber selected from the group consisting of natural rubber and synthetic, rubbery polymers of a compound selected from the group consisting of conjugated diolefins and chloroprene, and from about 0.1% to about 10% based on the weight of rubber of an unsymmetrical peroxide having the structural formula

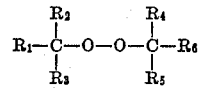

wherein $R_1$ is an aryl group and $R_2$, $R_3$, $R_4$, $R_5$, and $R_6$ are selected from the group consisting of hydrogen and alkyl groups of less than 4 carbon atoms.

2. The composition of claim 1 in which the peroxide is methyl($\alpha,\alpha$-dimethylbenzyl) peroxide.

3. The composition of claim 1 in which the peroxide is tertiary butyl($\alpha,\alpha$-dimethylbenzyl) peroxide.

4. The composition of claim 1 in which the peroxide is methyl($\alpha,\alpha$-dimethyl-p-methylbenzyl) peroxide.

5. The composition of claim 1 in which the peroxide is methyl($\alpha,\alpha$-dimethyl-p-isopropylbenzyl) peroxide.

6. The process of vulcanizing rubber which comprises heating a composition comprising a rubber selected from the group consisting of natural rubber and synthetic, rubbery polymers of a compound selected from the group consisting of conjugated diolefins and chloroprene, and from about 0.1% to about 10% of a peroxide having the structural formula

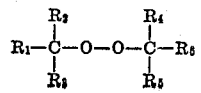

wherein $R_1$ is an aryl group and $R_2$, $R_3$, $R_4$, $R_5$, and $R_6$ are selected from the group consisting of hydrogen and alkyl groups of less than 4 carbon atoms.

7. The process of vulcanizing rubber which comprises heating a composition comprising a rubber selected from the group consisting of natural rubber and synthetic, rubbery polymers of a compound selected from the group consisting of conjugated diolefins and chloroprene, and from about 0.1% to about 10% of methyl($\alpha,\alpha$-dimethylbenzyl) peroxide.

8. The process of vulcanizing rubber which comprises heating a composition comprising a rubber selected from the group consisting of natural rubber and synthetic, rubbery polymers of a compound selected from the group consisting of conjugated diolefins and chloroprene, and from about 0.1% to about 10% of tertiary butyl($\alpha,\alpha$-dimethylbenzyl) peroxide.

9. The process of vulcanizing rubber which comprises heating a composition comprising a rubber selected from the group consisting of natural rubber and synthetic, rubbery polymers of a compound selected from the group consisting of conjugated diolefins and chloroprene, and from about 0.1% to about 10% of methyl($\alpha,\alpha$-dimethyl-p-methylbenzyl) peroxide.

10. The process of vulcanizing rubber which comprises heating a composition comprising a rubber selected from the group consisting of natural rubber and synthetic, rubbery polymers of a compound selected from the group consisting of conjugated diolefins and chloroprene, and from about 0.1% to about 10% of methyl($\alpha,\alpha$-dimethyl-p-isopropylbenzyl) peroxide.

11. The composition of claim 1 in which the rubber is a synthetic, rubbery polymer of a compound selected from the group consisting of conjugated diolefins and chloroprene.

12. The composition of claim 11 in which the synthetic, rubbery polymer is a copolymer of butadiene and styrene.

References Cited in the file of this patent

UNITED STATES PATENTS 1,249,181    Ostromislensky _____ Dec. 4, 1917

OTHER REFERENCES

Warden: India Rubber World, December 1944.
Kharasch et al.: Jour. of Organic Chemistry, volume 15, No. 4, pages 753–762, July 1950.